US00RE36658E

United States Patent [19]

Ingman

[11] E Patent Number: Re. 36,658

[45] Reissued Date of Patent: Apr. 18, 2000

[54] FLUID FLOW METER

[75] Inventor: Dov Ingman, Haifa, Israel

[73] Assignee: Measurement Technology International, Beverly Hills, Calif.

[21] Appl. No.: 08/912,797

[22] Filed: Aug. 18, 1997

Related U.S. Patent Documents

Reissue of:

[64] Patent No.: 4,920,794
Issued: May 1, 1990
Appl. No.: 07/212,955
Filed: Jun. 29, 1988

U.S. Applications:

[63] Continuation of application No. 08/210,805, Mar. 18, 1994, abandoned.

[51] Int. Cl.[7] ..... G01F 1/54; G01F 3/00

[52] U.S. Cl. ..... 73/269; 73/861.21

[58] Field of Search ..... 73/861.18, 861.21, 73/232, 269

[56] References Cited

U.S. PATENT DOCUMENTS

| | | | |
|---|---|---|---|
| 398,013 | 2/1889 | Welker | 73/269 |
| 3,015,953 | 1/1962 | Peltola | 73/861.21 |
| 3,175,399 | 3/1965 | Medlar | 73/861.21 |
| 3,792,204 | 2/1974 | Murayama et al. . | |
| 3,824,855 | 7/1974 | Heckle . | |
| 3,867,839 | 2/1975 | Herzl . | |
| 3,888,120 | 6/1975 | Burgess . | |
| 3,948,098 | 4/1976 | Richardson et al. . | |
| 4,141,246 | 2/1979 | Randolph . | |
| 4,358,954 | 11/1982 | De Jong | 73/269 |
| 4,409,830 | 10/1983 | De Jong et al. | 73/269 |
| 4,577,510 | 3/1986 | Bur et al. | 73/708 |
| 4,578,613 | 3/1986 | Posthuma De Boer . | |
| 4,594,890 | 6/1986 | Baker, Jr. | 73/269 X |

FOREIGN PATENT DOCUMENTS

| | | | |
|---|---|---|---|
| 59-5917 | 1/1984 | Japan . | |
| 59-40118 | 3/1984 | Japan . | |
| 63-3245 | 1/1988 | Japan . | |
| 0901823 | 1/1982 | U.S.S.R. | 73/269 |

*Primary Examiner*—Harshad Patel
*Attorney, Agent, or Firm*—Fulbright & Jaworski L.L.P.

[57] ABSTRACT

A fluid flow meter comprising a housing having a pair of fluid ports and defining therebetween a fluid flow path; a flexible membrane defining a pair of opposing faces and being mounted in the fluid flow path such that the pair of faces simultaneously define with the housing fluid impermeable seals at at least two different locations along the flow path, the membrane being operative to flex so as to permit passage therepast of discrete quanta of fluid, each having a known volume; apparatus for generating electrical signals corresponding to flexure of the membrane; and monitoring apparatus for receiving the electrical signals and thereby determining a fluid flow rate along the flow path.

55 Claims, 6 Drawing Sheets

FIG. 4
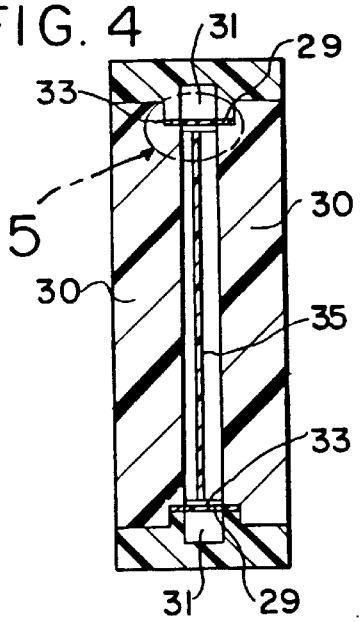
FIG. 5
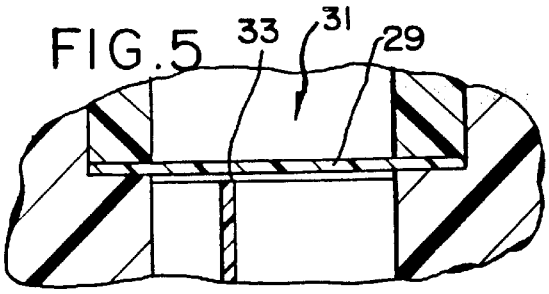
FIG. 6
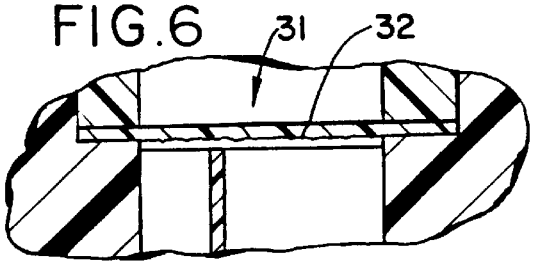
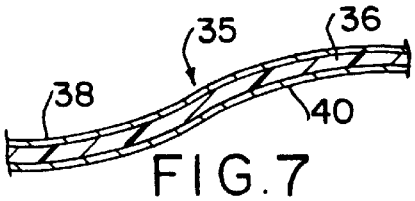
FIG. 7
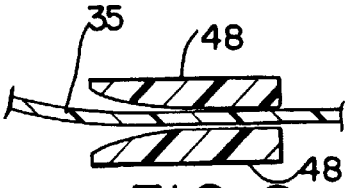
FIG. 8
FIG. 9
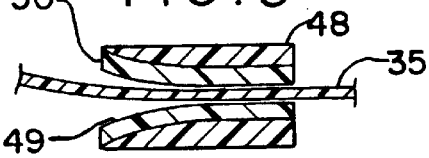
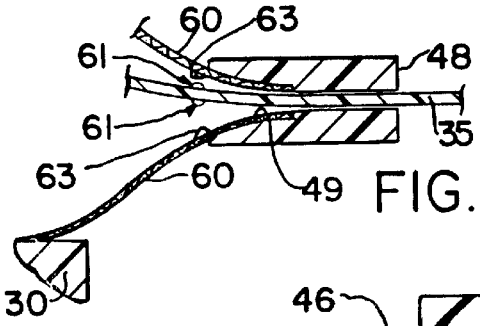
FIG. 10
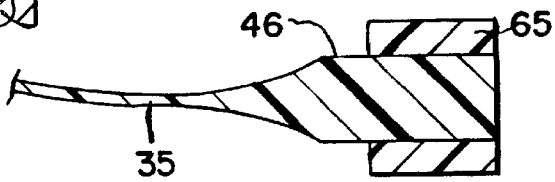
FIG. 11
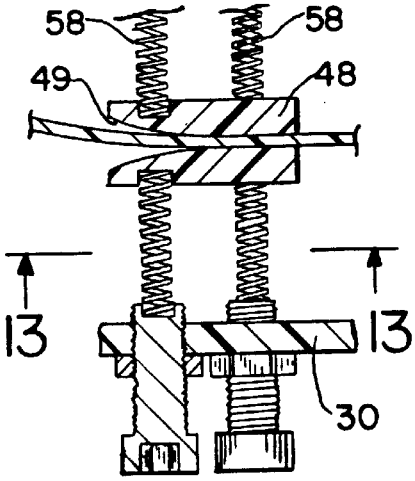
FIG. 12

FIG. 13
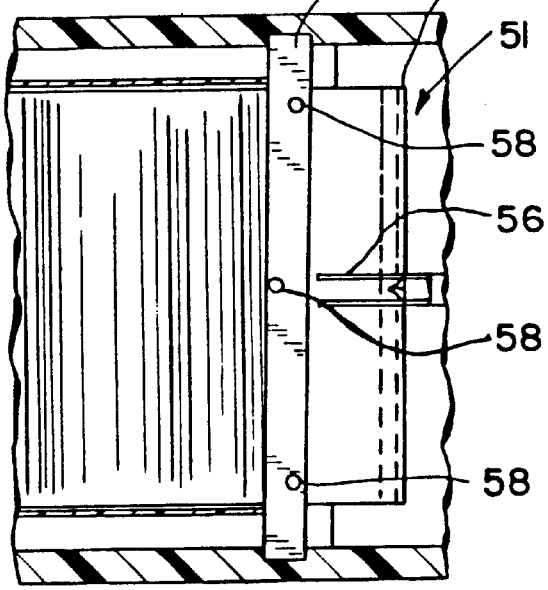
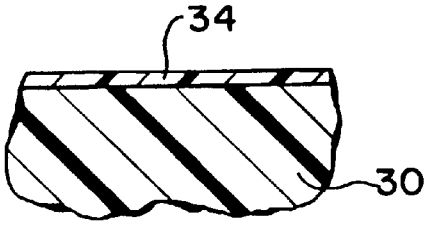
FIG. 14
FIG. 15A
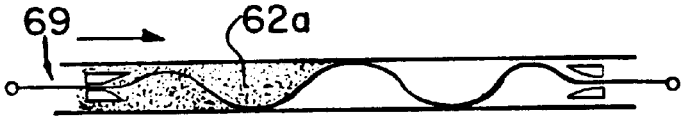
FIG. 15B
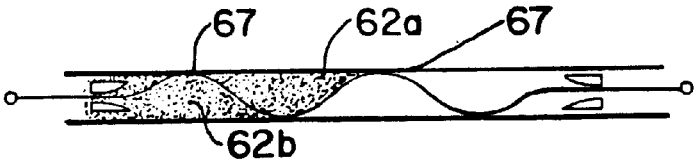
FIG. 15C
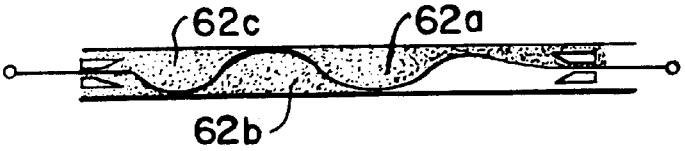
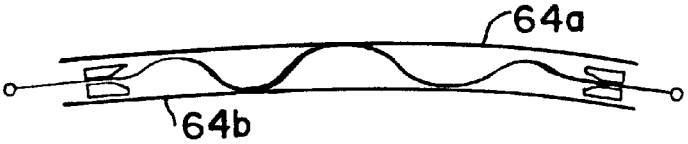
FIG. 16

FLUID FLOW METER

Matter enclosed in heavy brackets [ ] appears in the original patent but forms no part of this reissue specification; matter printed in italics indicates the additions made by reissue.

*This reissue application is a continuation of the reissue application No. 08/210,805 filed Mar. 18, 1994, now abandoned which is a RE of No. 07/212,955 filed Jun. 29, 1988, U.S. Pat. No. 4,920,794.*

FIELD OF THE INVENTION

The present invention relates generally to devices for measuring volumetric fluid flow and more specifically to a travelling wave flow meter having a thin flexible membrane whose flexing movement is operative to permit passage of fluid in travelling waves.

BACKGROUND OF THE INVENTION

There are known various types of flow meter which utilize a member which vibrates or undulates as fluid flows therepast. Fluid flow rates can be determined from the frequency of vibration or rate of undulation, which is generally proportional to the rate of fluid flow.

An early form of fluid meter having an undulating spring confined in a fluid flow chamber and a mechanical counter for indicating the amount of fluid flowing therethrough is described in U.S. Pat. No 398,013 (Welker). A more recent travelling wave flow meter, utilizing an undulating membrane formed of piezoelectric material which generates electrical signals as a function of the rate of undulation is described in U.S. Pat. Nos. 4,358,954 and 4,409,830 (both to de Jong).

The flow meter disclosed in the above-referenced U.S. Patents to de Jong is, however, limited in use to measurement of noncompressible fluids, such as liquids. If used for compressible fluids, such as gases, under a relatively high flow rate, the membrane would be liable to give rise to stretching thereof across a fluid flow path with which it is associated, so as to block fluid flow therealong.

SUMMARY OF THE INVENTION

It is an aim of the present invention to provide for the measurement of a wide range of compressible and noncompressible fluid flows, a positive displacement quantum fluid flow meter which overcomes disadvantages of the prior art.

There is provided, therefore, in accordance with an embodiment of the invention, a fluid flow meter comprising a housing having a pair of fluid ports and defining therebetween a fluid flow path; a flexible membrane defining a pair of opposing faces and being mounted in the fluid flow path such that the pair of faces simultaneously define with the housing fluid impermeable seals at two or more different locations along the flow path, the membrane being operative to flex so as to permit passage therepast of discrete quanta of fluid, each having a known volume; apparatus for generating electrical signals corresponding to flexure of the membrane; and monitoring apparatus for receiving the electrical signals and thereby determining a fluid flow rate along the flow path.

Additionally in accordance with an embodiment of the invention, the membrane further defines a pair of edges lying in respective planes substantially parallel to the direction of fluid flow and the fluid flow path has a uniform cross-sectional configuration along part of its length, the fluid impermeable seals being defined therealong.

Further in accordance with an embodiment of the invention, the part of the flow path length having a uniform cross-sectional configuration has a rectangular cross-sectional configuration and is defined by first and second pairs of parallel walls, the membrane being disposed therebetween such that the respective planes in which the membrane edges lie are aligned substantially parallel to the first pair of walls.

Additionally in accordance with an embodiment of the invention, the fluid impermeable seals are defined at three or more locations along the flow path.

Further in accordance with an embodiment of the invention, the membrane edges are spaced from the first pair of walls by substantially a fluid boundary layer thickness.

Additionally in accordance with an embodiment of the invention, the membrane has a rectangular configuration and is oriented such that its longitudinal axis lies parallel to the direction of flow.

Further in accordance with an embodiment of the invention, the membrane is operative to permit passage of discrete quanta of fluid by flexure in wavelike fashion, there also being provided apparatus for assisting the wavelike flexure of the membrane.

Additionally in accordance with an embodiment of the invention, the housing is configured to permit deposition of debris from the fluid at a location upstream of the membrane but downstream of an adjacent fluid port.

Further in accordance with an embodiment of the invention, the membrane comprises a layer of piezoelectric material.

According to an alternative embodiment of the invention, the apparatus for generating comprises first and second electrical contacts mounted, respectively, onto a surface of the membrane and in association with the monitoring apparatus and such that an electrical signal is generated upon release of a single quantum of fluid.

According to a further alternative embodiment of the invention, the flexible membrane comprises magnetized material and the apparatus for generating comprises a magnetic head operative to generate an electrical signal upon sensing proximity of the membrane thereto.

Additionally in accordance with an embodiment of the invention, the monitoring apparatus includes apparatus for identifying electrical signals generated by flexure of the membrane upon release therefrom of a single quantum of fluid.

Further in accordance with an embodiment of the invention, the monitoring apparatus also includes apparatus for determining the rate of fluid flow based upon electrical signals received over a measured period of time.

Additionally in accordance with an embodiment of the invention, the monitoring apparatus also comprises apparatus for storing a predetermined value of volume for a single quantum of fluid flow, apparatus for calculating a fluid flow rate corresponding to a number of electrical signals received over a measured period of time, apparatus for comparing the predetermined value for the single quantum with a value of volume corresponding to the flow delivery characteristics of the meter at the first rate of flow, apparatus for adjusting the predetermined value to the value of volume corresponding to the flow delivery characteristics and apparatus for repeatedly adjusting the predetermined value of volume of a single quantum of fluid so as to obtain an increasingly more accurate value of flow.

In accordance with an alternative embodiment of the invention, the fluid flow path has an arched configuration along its length.

BRIEF DESCRIPTION OF THE DRAWINGS

The present invention will be understood and appreciated more fully from the following detailed description taken in conjunction with the drawings, in which:

FIG. 4 is a cross-section taken along line 4—4 in FIG. 3;

FIG. 5 shows an enlarged detail of a portion of the cross-section shown in FIG. 4;

FIG. 6 shows an enlarged detail of a portion of the cross-section shown in FIG. 4, constructed according to an alternative embodiment of the invention;

FIG. 7 is a sectional illustration of a portion of a piezoelectric member useful in the flow meter of FIG. 1;

FIG. 8 is an enlarged cross-sectional view taken along line 8—8 in FIG. 3;

FIG. 9 is a view similar to that of FIG. 8, but showing a construction according to an alternative embodiment of the invention;

FIG. 10 is a view similar to that of FIG. 8, but showing a construction according to a further embodiment of the invention;

FIG. 11 shows a piezoelectric member similar to that shown in FIG. 7 but wherein the ends thereof are thickened;

FIG. 12 is a cross-sectional partial view of spring mounts for guide blocks shown in FIG. 8 to 10;

FIG. 13 is an elevational view of an end portion of the piezoelectric member shown in FIG. 3 and showing mounting details thereof;

FIG. 14 is a cut away illustration of a portion of a side wall of the housing of the flow meter shown in FIG. 1;

FIGS. 15A, 15B and 15C show three successive stages in the transport of discrete fluid quanta across the flow meter of FIG. 1;

FIG. 16 is a schematic illustration of a fluid flow meter similar to that shown in FIG. 1, but having arched walls;

DETAILED DESCRIPTION OF THE INVENTION

Figure 1:
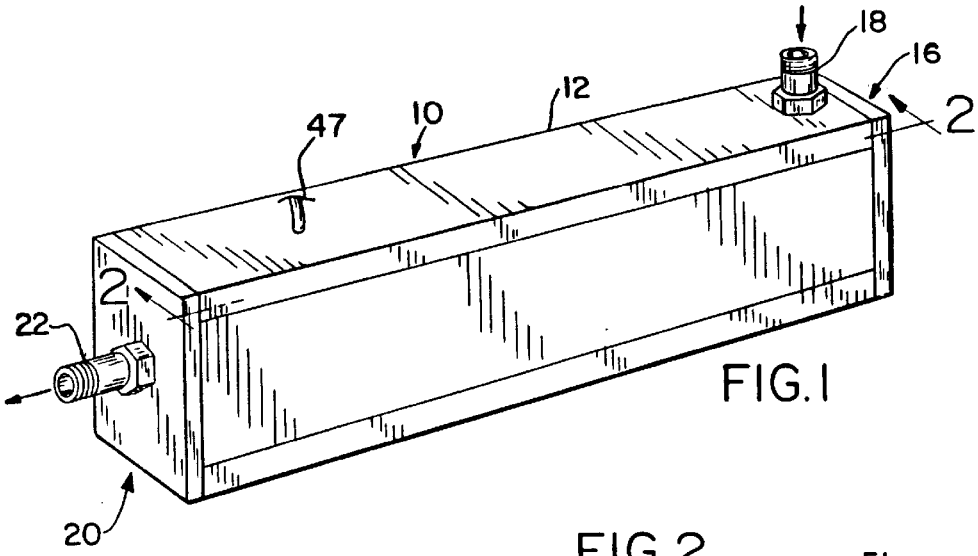
FIG. 1 is a perspective illustration of a quantum fluid invention.
Figure 2:
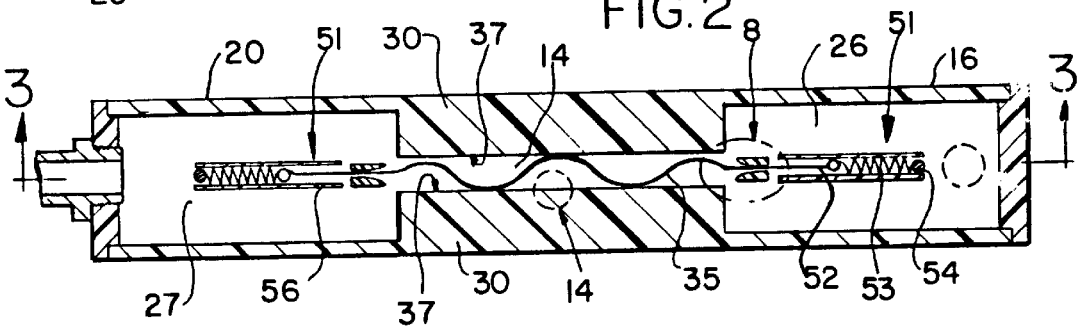
FIG. 2 is a sectional view of the flow meter of FIG. 1, taken along line 2—2 therein.
Figure 3:
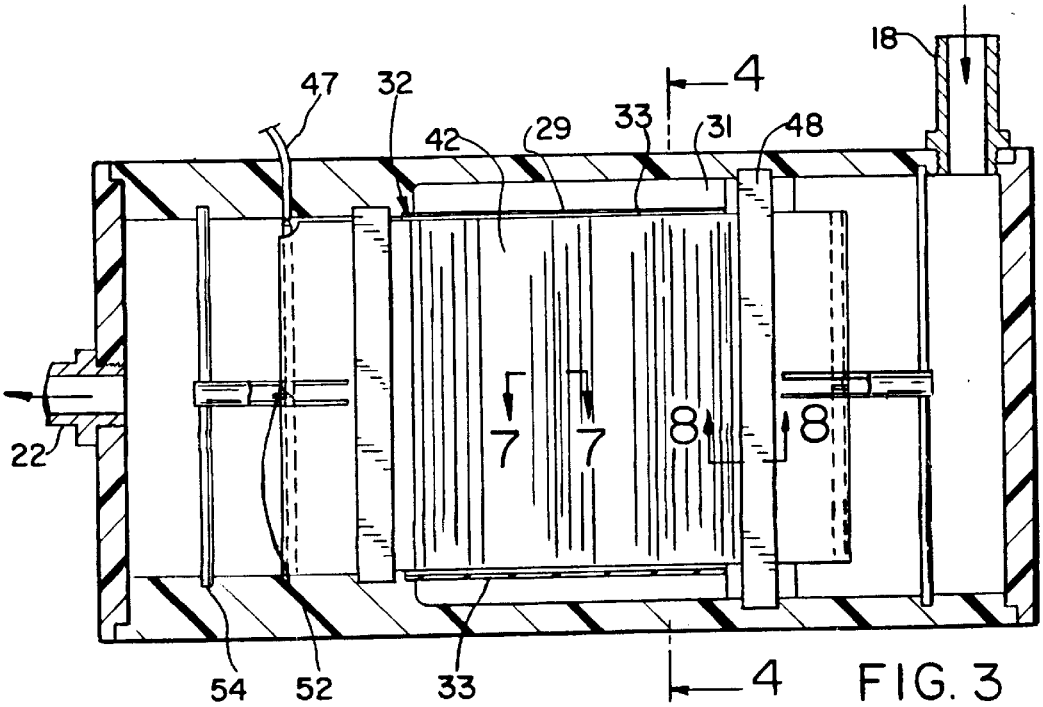
FIG. 3 is a cross-section taken along line 3—3 in FIG. 2.

Referring to FIGS. 1, 2 and 3, there is shown a positive displacement fluid flow meter, referenced generally 10, having a housing 12 defining a fluid flow chamber 14 (FIG. 2) and first and second ends 16 and 20, having respective first and second fluid ports 18 and 22.

Although in the shown embodiment, fluid ports 18 and 22 function respectively as an inlet and outlet, it will be appreciated from the ensuing description that the internal arrangement of flow meter 10 is such that fluid flow may take place in any chosen direction and with the flow meter at any preferred orientation.

According to a preferred embodiment of the invention, flow meter 10 is used for metering the flow of compressible fluids, such as gas. [As, however] *However*, as the flow meter of the present invention may also be used for the metering of noncompressible fluids such as oil or water, the flow of 'fluid' is described herein throughout except where not applicable.

According to the shown embodiment, housing 12 includes a first end receiving chamber 26 for receiving fluid flow from inlet 18 prior to the fluid passing through flow chamber 14. Chamber 26 permits any debris and, in the case of gas flow, moisture, to be deposited therein prior to flow through flow chamber 14. There is also provided a second end chamber 27, similar to first end chamber 26, for receiving therein any deposition of debris and moisture in a case of flow in a direction opposite to that indicated.

According to the present invention, discrete quanta of fluid, each having a known volume, are permitted to pass across a membrane 35 and volumetric flow may be determined according to the number of such quanta passing across the membrane. This is described in greater detail below. Although membrane 35 is positioned such that in a non-flow situation edges 33 thereof are very close to sidewalls 29, typically in the order of magnitude of several scores of microns, such that leakage of any fluid therepast is prevented, it is preferable in a flow situation, that the gap between the membrane edges and the sidewalls be reduced.

With reference additionally to FIGS. 4 and 5, flow chamber 14 is, therefore, provided with a pair of preferably rigid first sidewalls 30 and a pair of non-rigid second sidewalls 29 fabricated of a flexible elastomer, such as rubber. As fluid passes across membrane 35, pressure inside flow chamber 14 drops and the flexible, second sidewalls 29 tend, therefore, to move slightly inwards so as to reduce the gap between edges 33 of the membrane and sidewalls 29 to a fluid boundary layer thickness. Due to the high resistance to flow along the gap, leakage is, therefore, substantially prevented. The inward movement of sidewalls 29 is further facilitated by spaces 31 provided adjacent to edges 33 of membrane 35.

Referring briefly to FIG. 6, it has been found that when second sidewalls are not made from a flexible material. fluid leakage may be substantially prevented by providing them with a roughened surface 32 (also shown in FIG. 3).

With particular reference to FIGS. 2 and 14, sidewalls 30 are preferably coated with a thin layer 34 of an antistatic and hydrophobic material such as carbonated polyethylene. Layer 34 prevents the build-up of static electricity in the flow chamber and condensation of moisture on the sidewalls which might otherwise interfere with the flexing of membrane 35. As will be appreciated from the description below, the unimpeded flexing action of membrane 35 is important to maintain. According to an alternative embodiment of the invention, the sidewalls may be made entirely from an antistatic and hydrophobic material.

With particular reference to FIG. 7, there is shown a cross-section of a portion of membrane 35. According to the shown embodiment, membrane 35 is piezoelectric and comprises a thin layer 36 of piezoelectric material, such as polyvinylidene fluoride and metallized surrounding layers, referenced 38 and 42.

Figure 17:
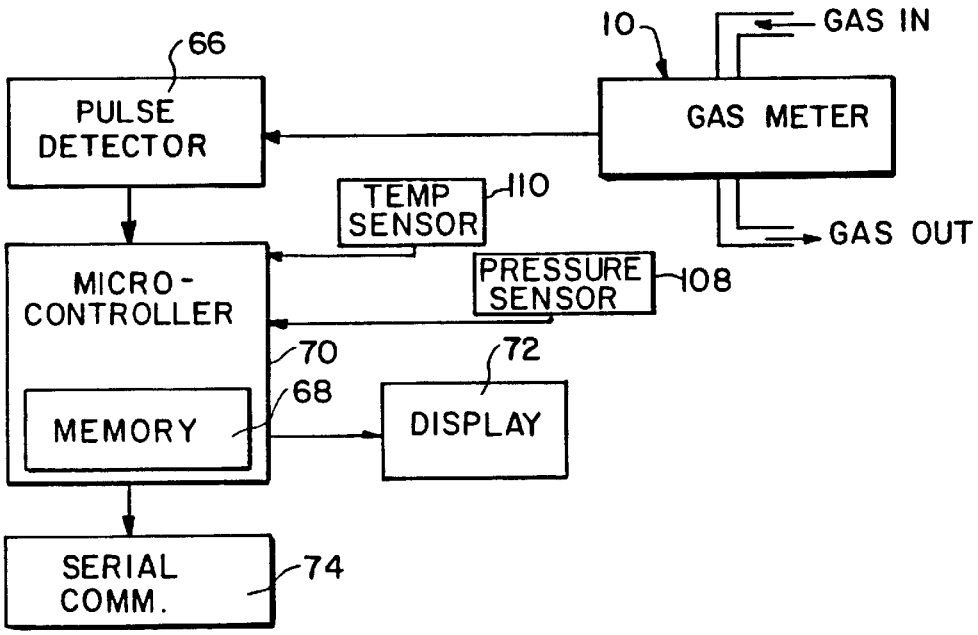
FIG. 17 is a block diagram illustration of electronic apparatus associated with a fluid flow meter of the present invention.
Figure 24:
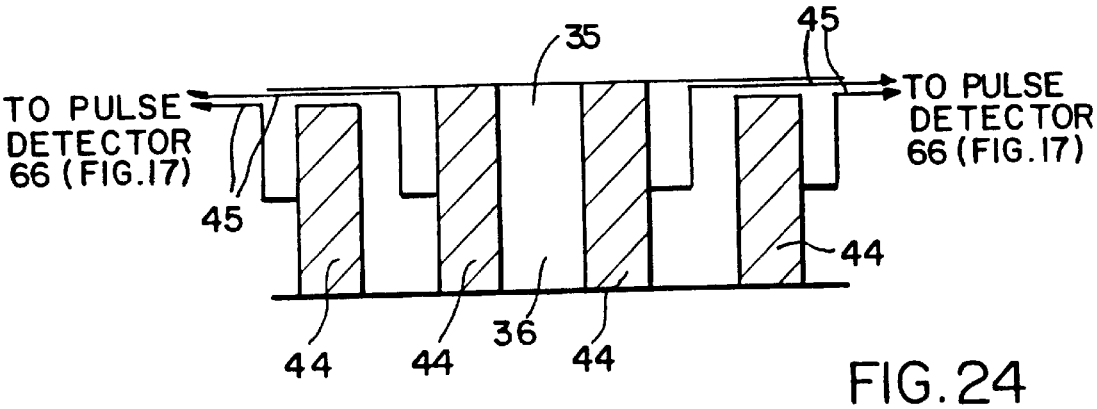
FIG. 24 is a top view of a piezoelectric member, constructed and operative in accordance with an alternative embodiment of the invention.

According to the embodiment shown in FIG. 24, membrane 35 is piezoelectric but, as distinct from the embodiment shown in FIG. 7, the layer 36 of piezoelectric material is overlaid, on either or both faces thereof, by discrete metallized strips 44, each having electrical connections 45 to a pulse detector unit 66 (FIG. 17). As the membrane flexes, as shown and described below in conjunction with FIGS. 15A to 15C, it is thus possible to determine the speed of wave propagation along the flow chamber which can be used by microcontroller 70 (FIG. 17) to further 'correct' the calculated volume of each quanta of fluid.

According to a preferred embodiment of the invention, membrane 35 has a substantially vertical position within flow chamber 14. This avoids possible unsymmetrical functioning of the membrane due to the effects of gravity.

As shown in FIG. 2, membrane 35 is preferably longer than the length of flow chamber 14 in which it is positioned. This ensures that membrane 35 takes up a wavelike position and that flat sides 42 of the membrane are in constant engagement with sidewalls 30 of the flow chamber, preferably, at at least three locations.

Referring now to FIGS. 2 and 13, it is seen that membrane 35 is, according to a preferred embodiment, secured at ends 51 thereof about rods 52. Each rod 52 is in turn secured to a fixed rod 54 by means of a spring 53 contained within a housing 56. This type of mounting, it will be appreciated, permits limited longitudinal movement of the membrane within flow chamber 14.

Referring now to FIGS. 2 and 8, rounded guide blocks 48 are provided so as to induce instability of membrane 35, it being noted that as each quantum of fluid passes thereacross, a very rapid change of position by flexure of membrane 35 is required. Provision of the guide blocks is an important feature as they assist in switching of the membrane from one position to another under a very low input of kinetic energy, such as occurs in gas flows. The range of positions taken up by membrane 35 upon flexure are described below in detail with reference to FIGS. 15A to 15C.

Referring briefly to FIG. 9, there is shown an alternative embodiment of guide blocks 48 in which each of the guide blocks also has an additional layer of rubber.

With reference to FIG. 10, there are provided fluid permeable guide extensions 60 that are attached to guide blocks 48 and constitute extensions of curved surfaces 49 thereof. Referring additionally to FIGS. 15A to 15C, it is seen that although membrane 35 generally does not move along the length of the flow chamber, as the discrete quanta of fluid pass through the flow meter, causing the membrane to undulate, points of contact between the membrane and the flow chamber walls 'travel' in the direction of fluid flow, the membrane moving by flexure from a first position just prior to release of a quantum of fluid, to a second position just after release of the quantum.

Guide extensions *60* are made, for example, from wire mesh. While not interfering, therefore, with the fluid flow, they have configurations similar to the membrane in either of its two respective positions taken up just before and after release of a quantum of fluid. As the points of contact between the membrane and the chamber walls, which are coincident with the maximum points of curvature of the membrane, move along the flow chamber towards an end thereof, they leave side walls 30 and mount guide extensions 60. Extensions 60 induce a degree of instability that causes, under a relatively low kinetic energy input, a relatively fast change of position of the membrane between the positions taken up thereby just before and after release of a quantum of fluid.

Although, as stated, membrane 35 generally does not move along flow chamber 14, a certain amount of relative motion does occur between the membrane and sidewalls 30 of the flow chamber. It is, therefore, important that inward-facing surfaces 37 of sidewalls 30 are very smooth.

According to one embodiment of the invention, as stated, membrane 35 is made from piezoelectric material. According to an alternative embodiment, however, as shown in FIG. 10, membrane 35 is not made from a piezoelectric material but instead has mounted on it a pair of electrical contacts 61, each *of* which is alternately brought into contact with a corresponding one of a pair of electrical contacts 63 mounted onto guide extensions 60.

It will be appreciated that as each quantum of fluid passes through flow chamber 14 and as membrane 35 switches from one position to the other, an electrical pulse is generated by contact of one of contacts 61 with a corresponding contact 63.

This embodiment has a particular advantage over a piezoelectric membrane as a discrete pulse is generated each time membrane 35 moves so as to release a quantum of fluid. When a piezoelectric membrane is used, however, every movement thereof generates electrical signals, a change in position of the membrane being indicated simply by an increase in intensity of the signals.

According to an alternative embodiment of the invention only a single one of each of electrical contacts 61 and 63 is provided, a single pulse thus being generated as every alternate quantum of fluid is passed. It will also be appreciated that contacts 61 and 63 may be incorporated into other embodiments of the invention, such as those illustrated in FIGS. 8 and 9. In yet a further alternative embodiment of the invention, electrical contacts 63 may be provided independently of guide blocks 48.

Figure 22:
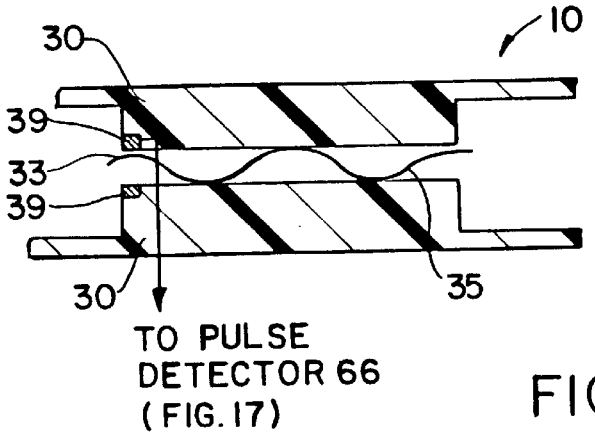
FIG. 22 shows a partial side-section of a fluid flow meter, constructed and operative with an alternative embodiment of the invention.

Referring now to FIG. 22, there is shown an alternative embodiment of the invention in which membrane 35 comprises a magnetic tape. Incorporated into sidewalls 30 are, preferably, a pair of magnetic heads 39. As the points of contact between the membrane and sidewalls 30 travel along the flow chamber, typically just as a quantum of fluid is released, a point of contact of membrane 35 with one of the sidewalls moves across an adjacent head 39, thereby generating an electrical pulse. According to the shown embodiment a signal is generated as every quantum of fluid is released while, according to an alternative embodiment, a single magnetic head may be provided so as to indicate release of alternate quanta of fluid.

Figure 23:
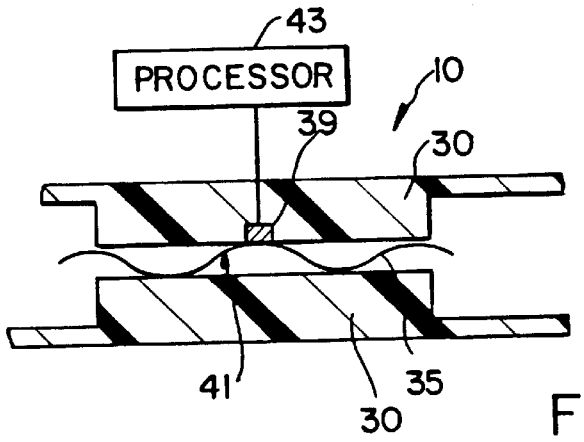
FIG. 23 shows a partial side-section of a fluid flow meter, constructed and operative with a further alternative embodiment of the invention.

Referring now to FIG. 23, in the shown embodiment, as with the embodiment of FIG. 22, membrane 35 comprises a magnetic tape. According to the shown embodiment, however, magnetic head 39 is embedded into second sidewall 30 of the flow chamber, and is operative to engage a face 41 of membrane 35 as it passes in contact therewith.

According to the shown embodiment, the membrane includes a plurality of magnetic bands provided thereon at a known frequency, such as 5 KHz. As face 41 passes in contact with head 39, processing apparatus 43 associated therewith is operative to sense not only passage of a portion of the membrane across the head, but it is also operative to sense the frequency at which the magnetic bands pass, and thus to determine the speed at which the fluid is passing.

Referring to FIG. 11, membrane 35 is shown with thickened ends 46 which may also include additional layers 65 of piezoelectric material. The thickened end and the additional layers of material serve to reduce the possibility of failure of the membrane due to fatigue stresses. According to an alternative embodiment, membrane 35 may have different cross-sectional thickness along the entire length thereof or along selected portions thereof.

As shown in FIGS. 12 and 13, guide blocks 48 are not rigidly positioned but are preferably secured by springs 58 to sidewalls 30 of the flow chamber.

Reference is now made to FIGS. 15A to 15C, in which there are shown successive stages of fluid flow through the flow meter of the invention. Initially, a first quantum of fluid passes into the flow chamber and exerts a force on the membrane until it is forced to change position. At this stage, the first quantum, referenced 62a, becomes entrapped between the wall of the flow chamber, the membrane and two points of contact, referenced 67, between the membrane and the flow chamber wall.

As the point of contact nearest an inlet 69 is being established, a second quantum of fluid, referenced 62b, enters the chamber and also exerts a force on the membrane, travelling downstream until eventually it too becomes entrapped.

A third quantum of fluid, referenced 62c, enters the flow chamber and also exerts a force on the membrane. The points of contact continue to travel downstream until the membrane moves by flexure from one position to another, thereby releasing the first quantum of fluid and generating an electrical pulse.

It has been found that when the membrane is in touching engagement with the flow chamber walls at at least three locations, possible distortion of the membrane and consequent blockage of the flow chamber, such as might otherwise result from a high rate of flow, is prevented.

Referring to FIG. 16, there is shown a flow chamber constructed in accordance with an alternative embodiment of the invention. The flow chamber, referenced 55, comprises a pair of curved walls 64a and 64b. The curvature of chamber 55 results in instability in the positions taken up by the membrane, which, as described above, is desirable. Although quanta of fluid flowing alongside the outer wall 64a will be larger than those flowing alongside inner wall 64b, the quantity of flow can be determined by taking an average of the two different-sized quanta.

Referring now to FIGS. 3 and 17, there is shown an electrical connection 47 to a metallized layer of piezoelectric membrane 35 for carrying to a pulse detector unit 66 (FIG. 17) electrical signals generated by movement of the membrane. According to an embodiment of the invention wherein membrane 35 is not piezoelectric but electrical contacts are used instead, electrical connection 47 is connected to the electrical contacts.

When a piezoelectric membrane is used, the pulse detector unit preferably includes signal processing electronic circuitry that is operative to recognize a particular shape of a pulse or an electrical signal corresponding to flexure of the membrane at the time of release of a quantum of fluid from outlet 22 of the fluid flow meter. It will be appreciated that it is important to be able to distinguish such pulses from background signals that are constantly being generated by the membrane.

A value for the volume of each quantum of fluid is either preset or predetermined and stored in a memory 68 of a microprocessor 70, such that each signal received represents the flow of a reference volume of fluid through the flow meter. The microprocessor preferably also has a display 72 and a serial communication port 74.

According to a preferred embodiment of the invention, by using the preset value for each quantum and according to electrical signals received, the microprocessor is operative to calculate the flow rate. By using flow delivery data, as are typically contained in a look-up table and by comparing the preset quantum value with a quantum value in the table corresponding the calculated flow rate, the microprocessor is operative to alter the preset quantum value to a different value. By repeating these steps of calculating and comparing, in iterative fashion, the microprocessor is operative to reach a "true" quantum value and, hence, a true flow value.

Also, according to a preferred embodiment of the invention, pressure and temperature sensors, respectively referenced 108 and 110 (FIG. 17), are mounted in the flow chamber and are effective to continuously provide to the microprocessor pressure and temperature readings. The microprocessor also calculates any necessary adjustment of the preset value for the volume of each quantity of fluid, according to the pressure and temperature data received.

The pressure and temperature readings may also be used by microcontroller 70 to provide an alarm indication when the temperature rises to a dangerously high level, which may indicate fire or where the pressure drops below a predetermined threshold value, which may serve as an indication of leakage in the system.

According to an alternative embodiment of the invention, multiple flow meters may be provided to accommodate a very large fluid flow, with the flow pulse signals being directed to a central microcontroller for determination of the overall fluid flow rate.

Figure 18:
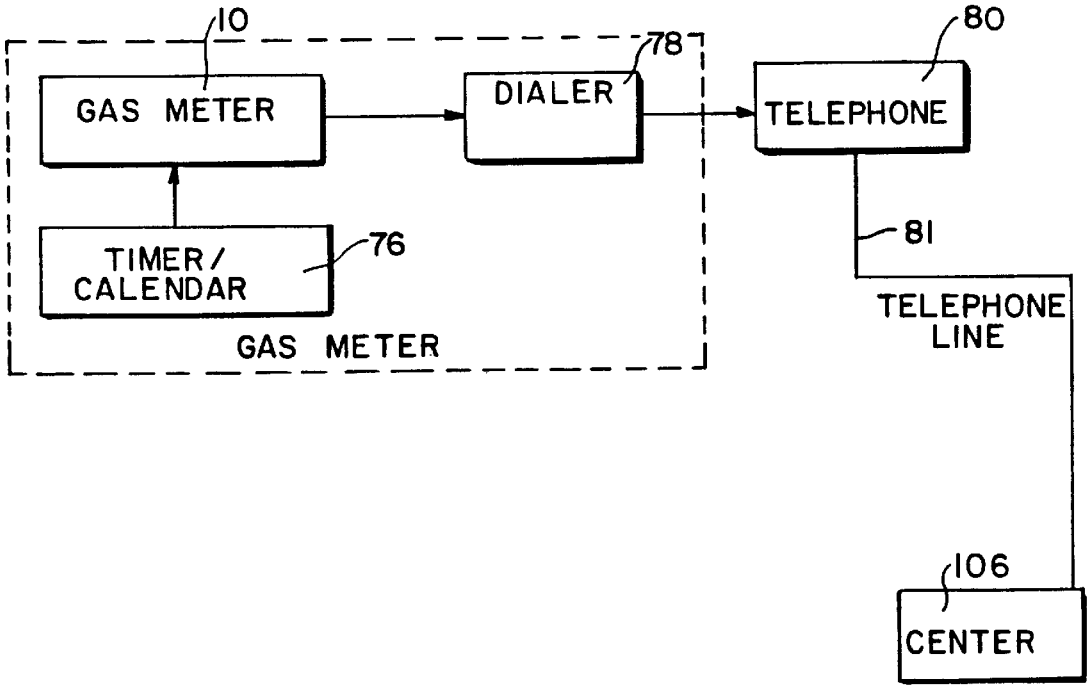
FIG. 18 is a block diagram illustration showing a telemetering system, useful in conjunction with a fluid flow meter of the present invention.

Reference is now made to FIG. 18, wherein there is shown, in block diagram form, centralized data collection apparatus utilizing the flow meter of the present invention. In accordance with a preferred embodiment of the invention, a dialer 78, which permits communication between the flow meter and a domestic telephone line 8!, is operative to automatically dial a data center 106 and to send thereto information pertaining to fluid flow as measured by the meter.

A timer 76 may also be provided to trigger dialer 78 at a given interval, such as once a month and preferably at a time when the telephone line is unlikely to be in use. The dialer is also preferably operative to continue dialing from the time it is triggered by timer 76, until it manages to get through to data center 106 and pass the required information. In the event that the connection is broken while the information is being passed, dialer 78 is operative to redial, if necessary repeatedly, until the information is successfully passed.

Figure 19:
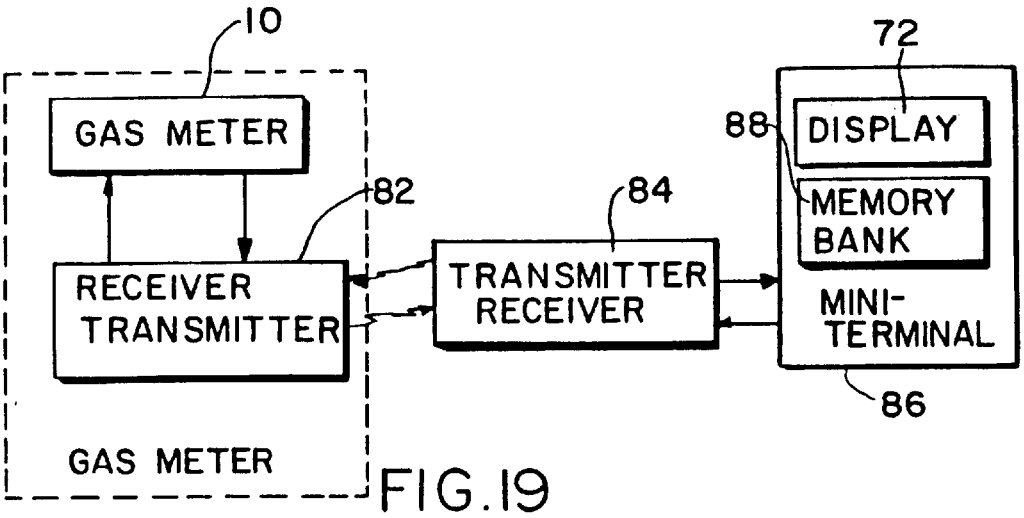
FIG. 19 is a block diagram illustration showing an alternative telemetering system, useful in conjunction with a fluid flow meter of the present invention.
Figure 20:
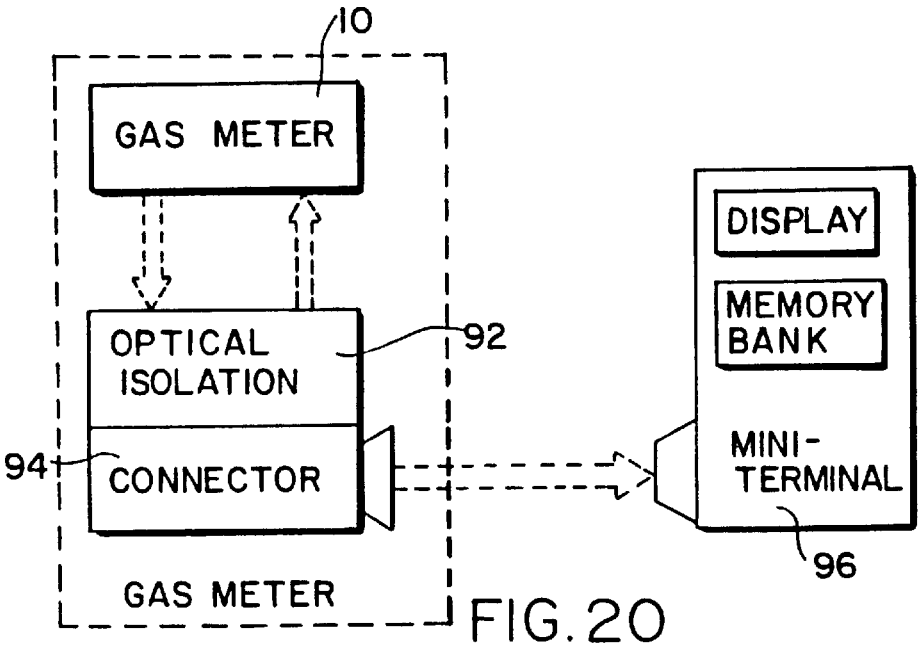
FIG. 20 is a block diagram illustration showing a further alternative telemetering system, useful in conjunction with a fluid flow meter of the present invention.

Referring now to FIG. 19, communication between the flow meter and a mini-terminal 86 may be provided by means of a first receiver-transmitter 82 linked to the flow meter and a second receiver-transmitter 84 associated with the mini-terminal. The mini-terminal may also be equipped with a memory bank 88 and a display panel 90. Local networks of an optically-isolated unit 92 may be provided through a connector 94 to a mini-terminal 96, as shown in FIG. 20.

Figure 21:
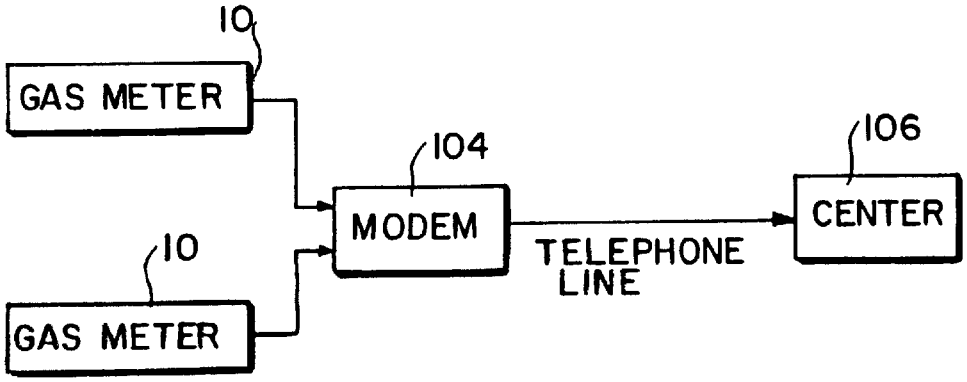
FIG. 21 shows a multiplexed telemetering system, useful in conjunction with a fluid flow meter of the present invention.

Referring to FIG. 21, fluid meters 10, which, according to a preferred embodiment are gas flow meters, may be connected with a remote data center 106 by means of a modem 104. This permits not only regular sending of flow information from the gas meters to the data center, but it also permits data center initiated scanning of the gas meters.

It will be appreciated by persons skilled in the art that the present invention is not limited to what has been shown and described hereinabove. The scope of the invention is, rather, limited solely by the claims, which follow:

I claim:

1. A fluid flow meter comprising:

a housing having a pair of fluid ports and defining therebetween a fluid flow path:

a flexible membrane defining a pair of opposing faces and being mounted in said fluid flow path such that said pair of faces simultaneously define with said housing fluid impermeable seals at at least two different locations along said flow path, said membrane being operative to flex so as to permit passage therepast of discrete quanta of fluid, each having a known volume varying as a function of flow rate;

means for generating electrical signals corresponding to flexure of said membrane; and monitoring means for receiving the electrical signals over a measured period of time, determining the rate of said electrical signals, determining the volume of said quanta based upon said electrical signal rate, and thereby determining a fluid flow rate along said flow path.

2. A fluid flow meter according to claim 1, and wherein said membrane further defines a pair of edges lying in respective planes substantially parallel to the direction of fluid flow and said fluid flow path has a uniform cross-sectional configuration along at least part of its length, said fluid impermeable seals being defined therealong.

3. A fluid meter according to claim 2, and wherein said part of said flow path length having a uniform cross-sectional configuration has a rectangular cross-sectional configuration and is defined by first and second pairs of parallel walls, said membrane being disposed therebetween such that said respective planes in which said membrane edges lie are aligned substantially parallel to said first pair of walls.

4. A fluid flow meter according to claim 3, and wherein said fluid impermeable seals are defined at at least three locations along said flow path.

5. A fluid flow meter according to claim 4, and wherein said membrane edges are spaced from said first pair of walls by substantially a fluid boundary layer thickness.

6. A fluid flow meter according to claim 5, and wherein said membrane has a rectangular configuration and is oriented such that its longitudinal axis lies parallel to the direction of flow.

7. A fluid flow meter according to claim 6, and wherein said membrane is operative to permit passage of discrete quanta of fluid by flexure in wavelike fashion, said membrane having first and second ends mounted in said housing, said flow meter further including at least one guide member adjacent to at least one of said ends for assisting the wavelike flexure of said membrane.

8. A fluid flow meter according to claim 7, and wherein said membrane first and second ends are mounted for partial rotation about respective first and second axes parallel to said second pair of walls and passing through said first pair of walls.

9. A fluid flow meter according to claim 8, and wherein said housing is configured to permit deposition of debris from said fluid at a location upstream of said membrane but downstream of an adjacent fluid port.

10. A fluid flow meter according to claim 9, and wherein each of said walls defines an inward-facing surface having antistatic and hydrophobic properties.

11. A fluid flow meter according to claim 7, wherein said flow meter includes a pair of guide block having rounded inner faces in opposing relationship adjacent at least one of said ends.

12. A fluid flow meter according to claim 7, wherein said at least one guide member comprises an elongated member.

13. A fluid flow meter according to claim 42, wherein each of said guide blocks further [comprise] *comprises* a fluid permeable extension mounted to said guide block inner face.

14. A fluid flow meter according to claim 1, and wherein said membrane comprises a layer of piezoelectric material.

15. A fluid flow meter according to claim [11] *14*, and wherein said membrane also comprises a pair of metallized layers surrounding said layer of piezoelectric material.

16. A fluid flow meter according to claim 15, and wherein said piezoelectric material is polyvinylidene fluoride.

17. A fluid flow meter according to claim 15, and wherein said metallized layer comprises discrete metallized portions provided at predetermined discrete locations on said membrane.

18. A fluid flow meter according to claim 1, and wherein said means for generating comprises first and second electrical contacts mounted, respectively, onto a surface of said membrane and in association with said monitoring means and such that an electrical signal is generated upon release of a single quantum of fluid.

19. A fluid flow meter according to claim 1, and wherein said flexible membrane comprises magnetized material and said means for generating comprises a magnetic head operative to generate and electrical signal upon sensing proximity of said membrane thereto.

20. A fluid flow meter according to claim 1, and wherein said monitoring means includes means for identifying electrical signals generated by flexure of said membrane upon release therefrom of a single quantum of fluid.

21. A fluid flow meter according to claim 1, and wherein there is also provided means for sensing the temperature of said fluid.

22. A fluid flow meter according to claim 21, and wherein said monitoring means also includes means responsive to said temperature sensing means for providing an alarm indication when the temperature of the fluid reaches at least a predetermined temperature.

23. A fluid flow meter according to claim 1, and wherein there is also provided means for sensing the pressure of the fluid.

24. A fluid flow meter according to claim 23, and wherein said monitoring means also includes means responsive to said pressure sensing means for providing an alarm indication when the pressure of the fluid reaches at least a predetermined pressure.

25. A fluid flow meter according to claim 1, and also including remote data collection means and wherein said monitoring means also includes means for providing fluid flow data thereto.

26. A fluid flow meter according to claim 31, wherein said remote data collection means comprises automatic dialing means operatively connected to a telephone communications systems.

27. A fluid flow meter comprising:

a housing having a pair of fluid ports and defining therebetween a fluid flow path;

a flexible membrane having varying thicknesses along at least part of its length defining a pair of opposing faces and being mounted in said fluid flow path such that said pair of faces simultaneously define with said housing fluid impermeable seals at at least two different locations along said flow path, said membrane being operative to flex so as to permit passage therepast of discrete quanta of fluid, each having a known volume;

means for generating electrical signals corresponding to flexure of said membrane; and monitoring means for receiving the electrical signals and thereby determining a fluid flow rate along said flow path.

28. A fluid flow meter comprising:

a housing having a pair of fluid ports and defining therebetween a fluid flow path;

a flexible membrane defining a pair of opposing faces and being mounted in said fluid flow path such that said pair of faces simultaneously define with said housing fluid impermeable seals at at least three different locations along said flow path, said membrane being operative to flex so as to permit passage therepast of discrete quanta of fluid, each having a known volume;

said membrane further defining a pair of edges lying in respective planes substantially parallel to the direction of fluid flow and said fluid flow path having a uniform cross-sectional configuration along at least part of its length, said fluid impermeable seals being defined therealong;

said part of said flow path length having a uniform cross-sectional configuration having a rectangular cross-sectional configuration defined by first and second pairs of parallel walls, said membrane being disposed therebetween such that said respective planes in which said membrane edges lie are aligned substantially parallel to said first pair of walls;

said membrane edges being spaced from said first pair of walls by substantially a fluid boundary layer thickness; and said first pair of walls being made from a flexible material;

means for generating electrical signals corresponding to flexure of said membrane; and monitoring means for receiving the electrical signals and thereby determining a fluid flow rate along said flow path.

29. A fluid flow membrane to claim 28, wherein each of said pair of side walls defines a space adjacent to a portion of said membrane.

30. A fluid flow meter according to claim 28, wherein said flexible material is a flexible elastomer.

31. A fluid flow meter comprising:

a housing having a pair of fluid ports and defining therebetween a fluid flow path;

a flexible membrane defining a pair of opposing faces and being mounted in said fluid flow path such that said pair of faces simultaneously define with said housing fluid impermeable seals at at least three different locations along said flow path, said membrane being operative to flex so as to permit passage therepast of discrete quanta of fluid, each having a known volume;

said membrane further defining a pair of edges lying in respective planes substantially parallel to the direction of fluid flow and said fluid flow path has a uniform cross-sectional configuration along at least part of its length, said fluid impermeable seals being defined therealong;

said part of said flow path length having a uniform cross-sectional configuration having a rectangular cross-sectional configuration and being defined by first and second pairs of parallel walls, said membrane being disposed therebetween such that said respective planes in which said membrane edges lie are aligned substantially parallel to said first pair of walls;

said membrane edges being spaced from said first pair of walls by substantially a fluid boundary layer thickness;

each of said first pair of walls comprising a roughened surface;

means for generating electrical signals corresponding to flexure of said membrane; and monitoring means for receiving the electrical signals and thereby determining a fluid flow rate along said flow path.

32. A fluid flow meter comprising:

a housing having a pair of fluid ports and defining therebetween a fluid flow path;

a flexible membrane defining a pair of opposing faces and being mounted in said fluid flow path such that said pair of faces simultaneously define with said housing fluid impermeable seals at at least two different locations along said flow path, said membrane being operative to flex so as to permit passage therepast of discrete quanta of fluid, each having a known volume;

means for generating electrical signals corresponding to flexure of said membrane; and monitoring means for receiving the electrical signals and thereby determining a fluid flow rate along said flow path;

said monitoring means including means for identifying electrical signals generated by flexure of said membrane upon release therefrom of a single quantum of fluid;

said monitoring means also including means for determining the rate of fluid flow based upon electrical signals received over a measured period of time; and said monitoring means also comprising means for storing a predetermined value of volume for a single quantum of fluid flow, means for calculating a fluid flow rate corresponding to a number of electrical signals received over a measured period of time, means for comparing said predetermined value for said single quantum with a reference value of volume based upon the flow delivery characteristics of said meter at said first rate of flow, means for adjusting said predetermined value to said reference value of volume based upon the flow delivery characteristics of said matter, and means for repeatedly adjusting the predetermined value of volume of a single quantum of fluid so as to obtain an increasingly more accurate value of flow.

33. A fluid flow meter according to claim 32, and wherein said monitoring means also includes means for calculating an adjusted quantum volume according to the sensed temperature of the fluid.

34. A fluid flow meter according to claim 32, and wherein said monitoring means also includes means for calculating an adjusted quantum volume according to the sensed pressure of the fluid.

*35. A fluid flow meter as in claim 1, wherein the membrane further comprises means for reinforcing against fatigue stresses.*

*36. A fluid flow meter as in claim 35, wherein the membrane has an end for mounting in the housing and the reinforcing means comprises a thickened cross-section at the end of the membrane.*

*37. A fluid flow meter as in claim 1, wherein the membrane has a pair of edges lying in respective planes substantially parallel to the direction of fluid flow, wherein the fluid flow path is defined by at least one pair of walls, and wherein the pair of edges of the membranes are spaced from the pair of walls respectively by substantially a fluid boundary layer thickness.*

*38. A fluid flow meter as in claim 37, wherein each of the pair of walls comprises a roughened surface.*

*39. A fluid flow meter as in claim 1, wherein the membrane has first and second ends mounted in the housing and wherein the flow meter includes a pair of guide blocks having rounded inner faces in opposing relationship adjacent at least one of the ends.*

*40. A fluid flow meter as in claim 39, wherein each of the guide blocks further comprises an extension mounted to each of the guide block inner faces, said extension allowing fluid to pass therethrough.*

*41. A fluid flow meter as in claim 27, wherein the membrane has a thickened end for reinforcing against fatigue stresses.*

*42. A fluid flow meter as in claim 27, wherein the monitor means further comprises means for compensating for non-uniformity of the volume of the quanta of fluid at different flow rates.*

*43. A fluid flow meter as in claim 42, wherein the compensating means comprises means for storing respective values of the volume of the quanta of fluid at different flow rates.*

*44. A fluid flow meter as in claim 27, wherein the membrane having first and second ends mounted in the housing and wherein the flow meter includes a pair of guide blocks having rounded inner faces in opposing relationship adjacent at least one of the ends.*

*45. A fluid flow meter as in claim 44, wherein each of the guide blocks further comprises an extension mounted to each of the guide block inner faces, said extension allowing fluid to pass therethrough.*

*46. A fluid flow meter as in claim 28, wherein the membrane further has means for reinforcing against fatigue stresses.*

*47. A fluid flow meter as in claim 46, wherein the reinforcing means comprises a thickened cross-section at an end of the membrane for mounting to the housing.*

*48. A fluid flow meter as in claim 28, wherein the monitor means further comprises means for adjusting the determined fluid flow rate to offset changes of the volume of the quanta of fluid at different flow rates.*

*49. A fluid flow meter as in claim 48, wherein the adjusting means comprises means for storing respective values of the volume of quanta of fluid at different flow rates.*

*50. A fluid flow meter as in claim 28, wherein the membrane has first and second ends mounted in the housing and wherein the flow meter includes a pair of guide blocks having rounded inner faces in opposing relationship adjacent at least one of the ends.*

*51. A fluid flow meter as in claim 50, wherein each of the guide blocks further comprises an extension mounted to each of the guide block inner faces, said extension allowing fluid to pass therethrough.*

*52. A fluid flow meter as in claim 31, wherein the membrane has first and second ends mounted in the housing and wherein the flow meter includes a pair of guide blocks having rounded inner faces in opposing relationship adjacent at least one of the ends.*

*53. A fluid flow meter as in claim 52, wherein each of the guide blocks further comprises an extension mounted to each of the guide block inner faces, said extension allowing fluid to pass therethrough.*

*54. A fluid flow meter as in claim 31, wherein the monitor means further comprises means for adjusting the determined fluid flow rate to offset changes of the volume of the quanta of fluid due to changes of the flow rate.*

*55. A fluid flow meter as in claim 54, wherein the adjusting means comprises means for storing respective values of the volume of quanta of fluid at different flow rates.*

* * * * *